United States Patent [19]

Strauss

[11] Patent Number: 5,793,780
[45] Date of Patent: Aug. 11, 1998

[54] METHOD FOR MONITORING TRANSMISSION OF DIGITAL DATA SIGNALS ON TWO PARALLEL DATA LINES

[75] Inventor: Klaus-Dieter Strauss, Braunschweig, Germany

[73] Assignee: Volkswagen AG, Wolfsburg, Germany

[21] Appl. No.: 592,996

[22] Filed: Jan. 29, 1996

[30] Foreign Application Priority Data

Jan. 31, 1995 [DE] Germany .................. 195 02 882.1

[51] Int. Cl.$^6$ ................................................ G06F 7/02
[52] U.S. Cl. ................................. 371/67.1; 327/58
[58] Field of Search .......................... 371/67.1, 68.1, 371/68.2, 28, 20.1, 20.4; 375/316, 317, 227, 224; 327/50, 58, 60, 62; 326/22

[56] References Cited

U.S. PATENT DOCUMENTS

| | | | |
|---|---|---|---|
| 3,991,379 | 11/1976 | Chadwick et al. | 327/98 |
| 4,575,683 | 3/1986 | Roberts et al. | 327/78 |
| 4,654,862 | 3/1987 | Camborde et al. | 375/227 |
| 4,697,098 | 9/1987 | Cloke | 327/58 |
| 4,926,442 | 5/1990 | Bukowski et al. | 375/317 |

FOREIGN PATENT DOCUMENTS

3342763 C2  11/1983  Germany .

Primary Examiner—Robert W. Beausoliel, Jr.
Assistant Examiner—Trinh L. Tu
Attorney, Agent, or Firm—Baker & Botts, L.L.P.

[57] ABSTRACT

A method for monitoring a serial transmission of digital data signals on two parallel data lines between mutually communicating signal processing devices in which the data signals are transmitted on the two data lines with mutually inverse signal levels. In order to ensure the operability of the input components of the signal processing devices, the signal levels of the signals which are received from the two data lines are compared individually or combined with at least one reference level limit which defines a limit of the permissible common-mode signal range for the operability of the signal processing devices.

5 Claims, 2 Drawing Sheets

METHOD FOR MONITORING TRANSMISSION OF DIGITAL DATA SIGNALS ON TWO PARALLEL DATA LINES

BACKGROUND OF THE INVENTION

This invention relates to methods for monitoring transmission of digital data signals on two parallel data lines between mutually communicating signal processing devices in which signals having mutually inverse signal levels are transmitted on the two data lines.

German Patent No. 33 42 763 discloses a circuit arrangement for monitoring symmetrical data transmission lines over which binary (digital) signals having mutually inverse signal levels are transmitted. In order to detect a short circuit or an interruption on one of the two data transmission lines, the absolute value of the difference between the voltage levels on the transmission lines is determined and compared with a reference value. If the absolute value is less than the reference value, a short circuit or an interruption on at least one of the two lines is indicated. This type of monitoring, however, has the disadvantage that it is only possible to locate faults for which the difference between the signal levels is smaller than a specific absolute value. If, however, both lines are at a high common voltage, if there is a short circuit of one line to ground, the signal voltage continues to occur on the other line and inverse signals are simulated. A similar fault can also occur in the case of a short circuit between one of the lines and a circuit section carrying operating voltage. This disadvantage is avoided by determining the mean value of the voltages on the two lines and comparing it with the mean value of the voltage on the second line. A fault signal is generated when the mean values differ from one another by more than a predetermined absolute value.

These two types of monitoring can be used successfully in testing for a short circuit to ground or to an operating voltage or for a line interruption and a short circuit or an interruption on one of the lines can be reliably detected in the second case even if there is interference, for example due to a radio-frequency field because common-mode voltages, i.e., those which are scattered into both lines by interference fields, are compensated by subtracting the signal levels of the two lines. However, there are problems with common-mode voltages which can not be processed by the input components of the signal processing devices and which lead to failure of the devices.

SUMMARY OF THE INVENTION

Accordingly, it is an object of the present invention to provide a method for monitoring transmission of digital data signals which overcomes the disadvantages of the prior art.

Another object of the invention is to provide a method for monitoring transmission of digital data signals which ensures unambiguous detection of false signal levels resulting from common-mode voltages and prevents overloading of individual system components by radio-frequency interference signals having levels which exceed the total permissible range of the input signal components.

These and other objects of the invention are attained by providing at least one reference level limit which defines the permissible common-mode voltage range for the signal levels of data signals having mutually inverse signal levels which are transmitted on the two data lines and are to be supplied to input components, for example, differential amplifiers, of the signal processing devices.

According to one embodiment of the invention, at last one of the data signals on the two lines is compared with at least one reference level limit which has a magnitude corresponding to the maximum permissible common-mode voltage range of the input components.

According to another embodiment, the input components of the signal processing devices are protected by comparing both the data signal on one line and the data signal on the other line, which has an inverse voltage level, with at lease one reference signal level, the magnitude of the reference level corresponding to the maximum permissible variation of signal levels.

In accordance with still another embodiment, the data signals are additively combined with one another and the resulting signal is compared with at least one reference level limit having a magnitude corresponding to one of the limits of the maximum permissible variation of common-mode signal levels.

Since the addition of the data signals without any superimposed interference voltage always produces the level 1, the reference level limit is fixed both above and below the level 1 with a spacing from the level 1 which corresponds to approximately twice the maximum permissible noise level.

In order to detect the presence of a short circuit to ground or to the operating voltage, or a line interruption on one of the data lines, the difference between the two data signals is compared with at least one reference voltage limit which is within the signal level range of the difference values.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
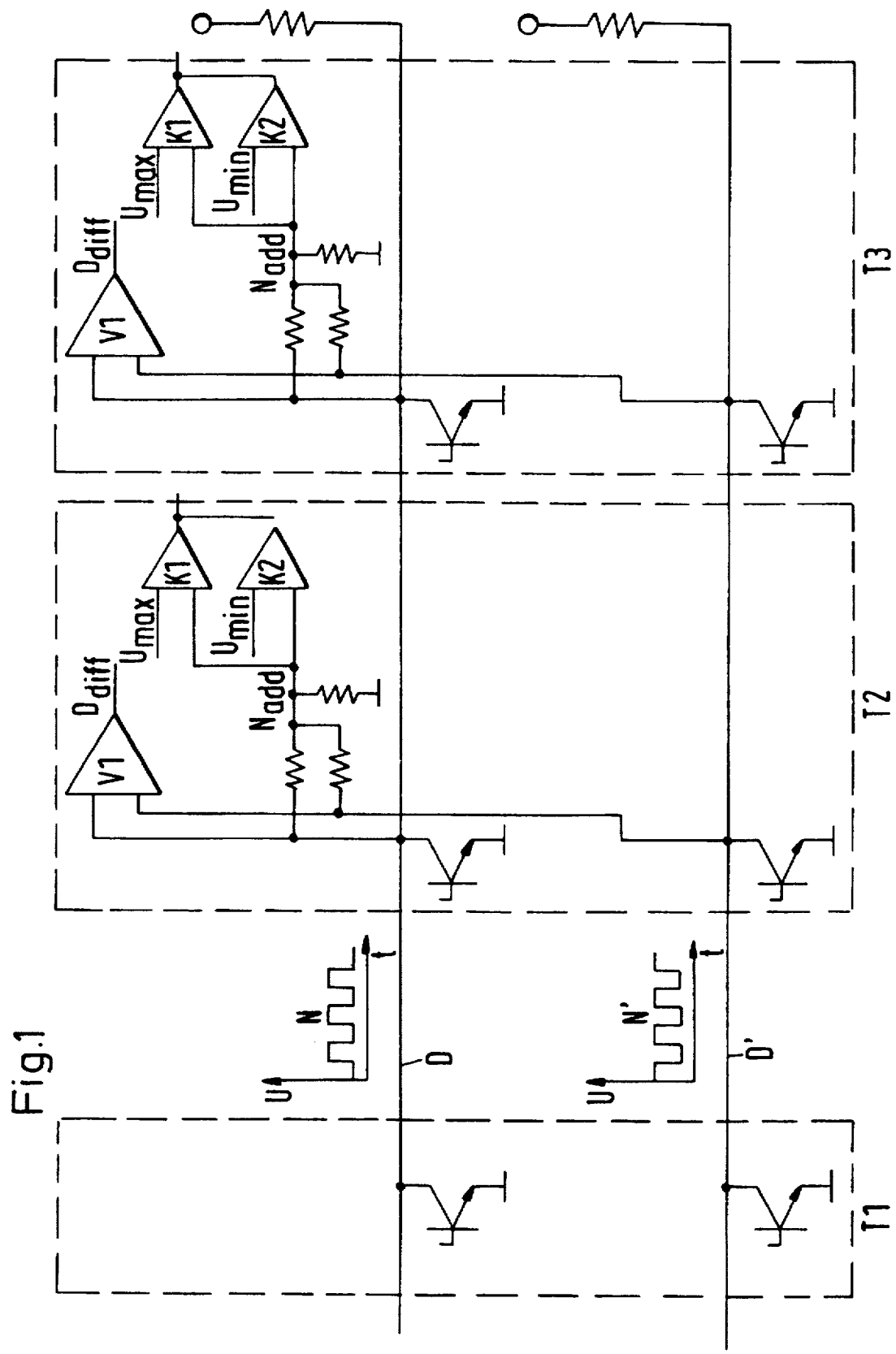
FIG. 1 is a schematic diagram illustrating a representative embodiment of a monitoring circuit for signal processing devices in accordance with the invention.

In the typical embodiment illustrated in FIG. 1, a signal processing system for serial transmission of digital data signals on two parallel data transmission lines D and D' transmits an actual data signal N on the data line D, and a data signal N', which has an inverse signal level relative to the data message N, on the data line D'. The data transmission lines D and D' are connected between a transmitter T1 and a plurality of receivers, only two of which, T2 and T3, are shown in the drawing, each having an identical checking circuit for monitoring transmitted signals. In each checking circuit, a difference signal $D_{dif}$ representing the difference between the data signals is produced by a differential amplifier V1 in order to compensate for possible common-mode voltages caused by radio-frequency interference which occurs from time to time. Since a differential amplifier operates reliably only in a specific common-mode range, the levels of the data signals N and N' are checked to make certain that they do not exceed this common-mode range. For this purpose, in accordance with the invention, the data signals N and N' are compared individually or in combination with reference voltage limits which define the common-mode voltage range. The checking circuit in the exemplary embodiment shown in the drawing is designed to check for this condition by additive combination of the data signals N and N' to produce a combined signal $N_{add}$ which is supplied to two comparators K1 and K2. In the comparator K1, the signal $N_{add}$ is compared with a reference voltage limit $U_{max}$ which has a value above the logic level 1. The signal $N_{add}$ is compared in the comparator K2 with a reference voltage limit $U_{min}$ which has a value below the logic level 1. The signal $N_{add}$ always has the logic level 1 when nonfalsified data signals N and N1 are added. Because any superimposed noise levels are also added during the combination of N and N', it is advantageous to fix the upper and lower reference voltage limits $U_{max}$ and $U_{min}$ with a spacing from the level 1 which corresponds to twice the permissible noise level $2SP_{max}$.

Figure 2:
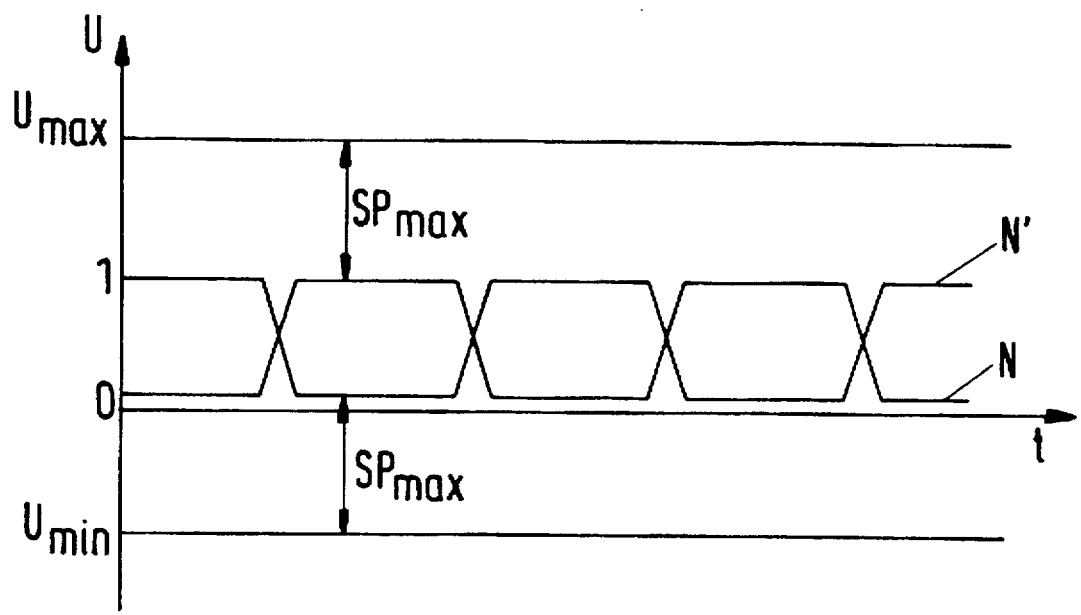
FIG. 2 is a graphical representation showing the voltage-time characteristics of both data signals during the checking of an individual data signal.
Figure 3:
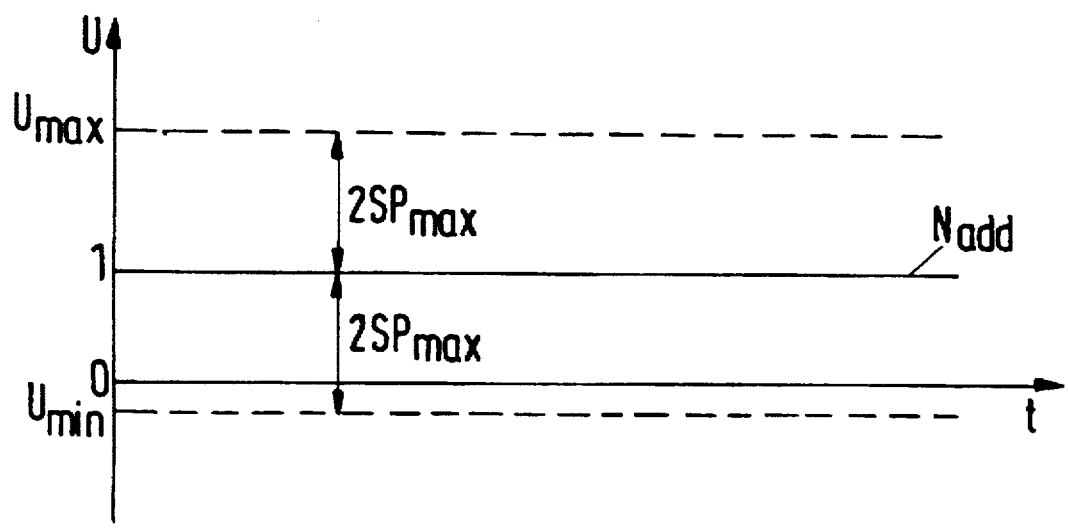
FIG. 3 is a graphical representation showing the voltage-time characteristic during checking of additively combined data signals.

FIG. 2 shows the voltage-time characteristic U(t) of the data signals with the reference voltage limits $U_{max}$ and $U_{min}$ located respectively above and below the signal level range 0 to 1, the reference voltage limit $U_{max}$ being spaced above the logic level 1 and the reference voltage limit $U_{min}$ being spaced below the logic level 0 by amounts corresponds to the maximum permissible noise voltage level $SP_{max}$. FIG. 3 shows the voltage-time characteristic U(t) of the combined signal $N_{add}$ with respect to the reference voltage limits $U_{max}$ and $U_{min}$, which are spaced from the $N_{add}$ level by amounts corresponding to twice the permissible noise voltage level, i.e. $2SP_{max}$. In a simplified embodiment, the signals N and N' and the combined signal $N_{add}$ are compared with only a single reference voltage limit when checking the data signals. Whether the lower reference voltage limit $U_{min}$ or the upper reference voltage limit $U_{max}$ is used depends, for example, on the design of the input components of the signal processing devices T2 and T3.

Although the invention has been described herein with reference to specific embodiments, many modifications and variations therein will readily occur to those skilled in the art. Accordingly, all such variations and modifications are included within the intended scope of the invention.

I claim:

1. A method for monitoring serial transmission of digital data signals on two data lines connected in parallel between mutually communicating signal processing devices comprising:

transmitting two data signals having mutually inverse signal levels on two data lines communicating with a plurality of signal processing devices, at least one of the signal processing devices acting as a transmitter and other signal processing devices acting as receivers, and comparing the two data signals received in the receivers from the two data lines, either individually or combined, with at least one reference level which defines a permissible maximum signal level for operation of the signal processing devices.

2. A method according to claim 1, comprising comparing at least one of the received signals with at least one reference level which corresponds to a limit of the maximum permissible common-mode range of the signal processing devices.

3. A method according to claim 1, comprising comparing each of the received signals with at least one of two reference level limits having magnitudes corresponding to the limits of the maximum permissible common-mode range of the signal processing devices.

4. A method according to claim 1, comprising additively combining the two received signals and comparing the combined signal with at least one reference level limit corresponding to one of the limits of the maximum permissible common-mode range of the signal processing devices.

5. A method for monitoring serial transmission of digital data signals on two data lines connected in parallel between mutually communicating signal processing devices at least one of the signal processing devices acting as a transmitter and other signal processing devices acting as receivers wherein the data signals are transmitted on the two data lines with mutually inverse signal levels comprising:

comparing signals received in the receivers from the two data lines either individually or combined, with at least one reference level which defines a permissible maximum signal level for operation of the signal processing devices, determining a difference between the signal levels of the two received signals; and comparing the difference between the signal levels with at least one reference voltage limit which has a level located within a permissible signal level range of the signal processing devices for the differences between received signal levels.

* * * * *